United States Patent [19]
Rasenberger

[11] 3,921,484
[45] Nov. 25, 1975

[54] FLYING SHEAR FOR DIVIDING MOVING SHEET-METAL STRIP

[75] Inventor: Otto Rasenberger, Goeppingen, Germany

[73] Assignee: L. Schuler GmbH, Goeppingen, Germany

[22] Filed: Jan. 20, 1975

[21] Appl. No.: 542,302

[30] Foreign Application Priority Data
Jan. 19, 1974 Germany............................ 2402571

[52] U.S. Cl. ................................................ 83/320
[51] Int. Cl.² ......................................... B23D 25/04
[58] Field of Search ....... 83/318, 319, 320; 100/178

[56] References Cited
UNITED STATES PATENTS
3,800,646 4/1974 Benz ................................. 83/320 X Primary Examiner—J. N. Meister
Attorney, Agent, or Firm—Craig & Antonelli

[57] ABSTRACT

Flying shear apparatus for cross-cutting moving sheet material including upper and lower cutting bars movable together in the travel direction of the sheet material and reciprocating means for moving the lower cutter bar in a cutting direction towards said upper bar and transverse to the travel direction. The reciprocating means includes a drive shaft rotatable at a continuous rotational speed, a crank member rotatable with said drive shaft, a coupling member having one end connected to the crank member and the other end connected with one end of a swivel arm, which swivel arm has the other end formed as the lower cutting bar.

7 Claims, 1 Drawing Figure

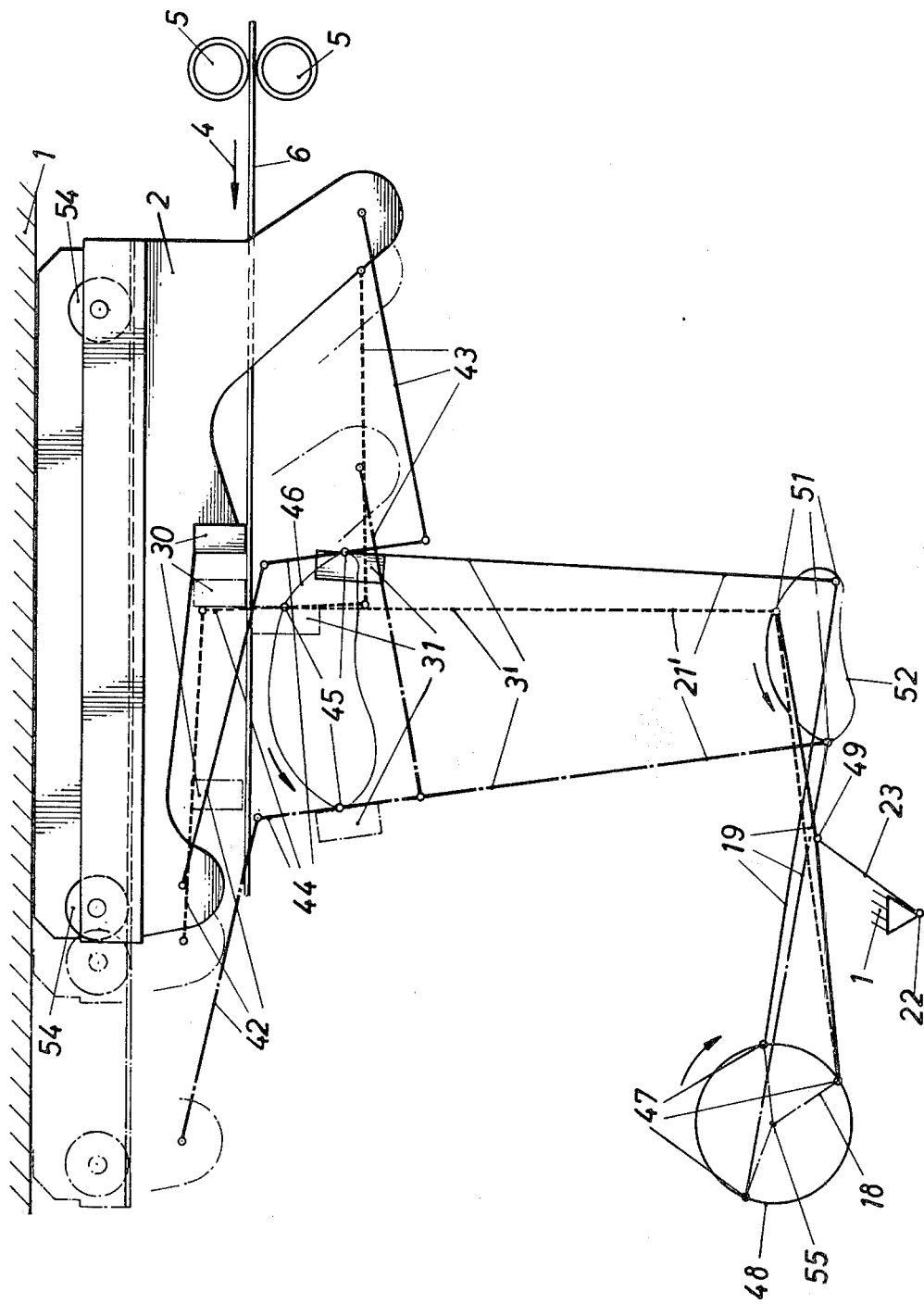

3,921,484

FLYING SHEAR FOR DIVIDING MOVING SHEET-METAL STRIP

BACKGROUND AND SUMMARY OF THE INVENTION

Commonly assigned pending U.S. Pat. application Ser. No. 406,358, filed Oct. 15, 1973, relates to a flying shear for subdividing or cutting traveling sheet-metal strip, with a lower cutter bar and an upper cutter bar, both of which cutter bars are reciprocatable in the travel direction of the sheet-metal strip, and one of which cutter bars being drivable in the cutting direction by means of a crank drive rotating at uniform velocity by way of a gear system having a coupling member hingedly joined at one end to the crank drive, and at the other end via a swivel arm to the cutter bar executing the cutting motion, and furthermore articulated between both ends to a press rod swinging about a fixed axle. The subject matter of this U.S. patent is hereby incorporated herein to the extent necessary for a full understanding of the present invention.

The present invention contemplates an improved simple constructional arrangement with favorable kinematic conditions of a flying shear of the type disclosed in said co-pending application.

The present invention contemplates providing, in a flying shear of the type disclosed in the above-noted application, that the end of the swivel arm facing away from the hinged connection to the coupling member constitutes the cutter bar executing the cutting motion, to which cutter bar the associated blade is attached; and that this cutter bar executing the cutting motion is articulated to the couple of a quadrilateral bell crank linkage hingedly joined to the other cutter bar. The invention further contemplates providing that the two control arms of this bell crank linkage swing about a position approximately parallel to the direction of motion of the other cutter bar, wherein the motion component, produced by the crank drive, of the articulation of the swivel arm at the coupling member in parallel to the direction of motion of the other cutter bar is approximately in synchronism with the motion of the other cutter bar, at least over portions of the travel path.

This arrangement makes it possible to construct the flying shear with a small number of parts for the moving mechanism for the blade which travels in the cutting direction, wherein only a minor number of joints, guides, or the like is required due to the formation of the one cutter bar directly on the end of the swivel arm. Thereby, a very accurate guidance of the blade movable in the cutting direction is provided as compared to the blade which is movable only in the travel direction of the sheet-metal strip, and thus a very accurately guided cut can be executed. These advantages are primarily based on the realization that with a suitable selection of the dimensions by means of the crank drive and the press rod it is possible to attain a movement of the articulation of the swivel arm to the coupling member which is with sufficient accuracy (to permit the cutter bar to be formed at the end of the swivel arm without additional joints or guides) approximately in synchronism with the other cutter bar, at least over part of the travel path in the travel direction of the sheet-metal strip, this other cutter bar being movable only in this travel direction. At the same time, the motion of the one cutter bar in the cutting direction is derived from the crank drive.

An advantageous further development of the flying shear according to this invention resides in that the apparatus is constructed so that the motion component of the articulation of the swivel arm to the coupling member in parallel to the travel direction of the other cutter bar is delayed to a slight extent from the beginning of the cutting operation with respect to the synchronism with the motion of the other cutter bar. The advantage of this measure resides mainly in that the blade movable in the cutting direction assumes, after the beginning of the cutting procedure, a slightly inclined position with respect to the blade movable only in the travel direction of the sheet-metal strip, so that a side clearance angle is formed and the friction between the blades is reduced.

These and other objects, features and advantages of the present invention will become more apparent from the following description when taken in connection with the accompanying drawing which shows, for purposes of illustration only, one embodiment in accordance with the present invention.

BRIEF DESCRIPTION OF THE DRAWINGS

The single drawing FIGURE shows, as examples for the device of this invention, the parts of a flying shear which are kinematically important to an understanding of the invention, in a schematic lateral view with the thus-attained course of motions.

DETAILED DESCRIPTION OF THE DRAWINGS

In a shear frame 1, an upper cutter bar 2 is supported to be reciprocating in the travel direction 4 of the sheet-metal strip 6, by means of rollers 54 and with antifriction bearings—not shown in the drawing—to transmit the cutting power or force from the upper cutter bar 2 to the shear frame 1. Furthermore, the shear frame 1 carries a driven shaft 55 of a crank drive 18. The drive for the reciprocating motion of the upper cutter bar 2 is derived from the shaft 55—by way of means not illustrated in the drawing—in such a manner that the cutter bar 2 executes, at least during the cutting operation, a synchronous movement with a traveling sheetmetal strip 6, fed by the roller pair 5. An example for such a drive can be seen from German Utility Model No. 72 29 447. Further, since the abovementioned co-pending U.S. Patent Application discloses details of the overall flying shear construction to be used in conjunction with the present invention, such details are dispensed with herein in order not to observe the present invention.

A quadrilateral bell crank linkage is mounted to the upper cutter bar 2, including two control arms 42, 43 and couple 44. A pivot pin 45 is provided in the bisecting point of the couple 44 and lower cutter bar 3' is articulated to this pivot pin 45. The lower cutter bar 3' simultaneously constitutes the upper end of the swivel arm 21'. The lower end of the swivel arm 21' is hingedly joined by means of the journal 51 to one end of the coupling member 19 or like the other end of the coupling member is supported on the crank pin 47 of the crank drive 18. Crank drive 18 imparts movement along the circular path 48 to this end of the coupling member 19.

Furthermore, the coupling member 19 is provided between its two ends with the articulation to the press rod 23 by means of pin 49. The press rod 23 is swingingly supported in the axle 22 at the shear frame 1.

To absorb considerable cutting forces, the swivel arm 21' can be fashioned, with its upper end forming the lower cutter bar 3', as a plate extending at right angles to the travel direction 4 of the sheet-metal strip 6, this plate being driven, via several pins 51, coupling members 19, crank pins 47, and crank drives 18, each of which are disposed side-by-side in the axial direction of the shaft 55, by means of the latter. Several press rods 23 in an appropriate arrangement must be provided for this purpose. For the axle 22, it is contemplated to provide an adjustability—not shown in the drawing—between an upper position—shears are cutting—and a lower position—shears are not cutting. (See the above-mentioned co-pending U.S. Patent application for disclosure of adjustability apparatus that could be used for axle 22).

The top blade 30 is attached to the upper cutter bar 2, and the bottom blade 31 is mounted to the lower cutter bar 3'.

In the drawing, the curve 46 traversed by the pivot pin 45 and the curve 52 traversed by the journal 51 are shown together with three preferred positions of the corresponding parts, namely the two end positions of the upper cutter bar 2 and the position associated with the beginning of the cutting operation. The solid line depiction of the various members in the drawings shows first or most rightward end position of the upper cutter bar 2, while the dotted-line depiction shows an intermediate position at the beginning of the cutting operation of the dotted line depiction shows the extreme left position of the cutter bar 2.

I claim:

1. Flying shear apparatus for cross-cutting moving sheet material comprising:
   a first cutting bar,
   a second cutting bar,
   first reciprocating means for reciprocating both of said bars in the travel direction of the sheet material, said first reciprocating means including a movable driving member attached to only one of said cutting bars and guide means interconnecting said cutting bars with one another for movement together in the travel direction,
   and second reciprocating means for reciprocating said first bar relative to said second bar in a cutting direction transverse to said travel direction, said first and second cutting bars being positioned in opposing relationship to one another such that said cutting bars cooperate to cut said sheet material upon a predetermined relative movement of said cutting bars in the cutting direction, said second reciprocating means including a rotatable drive shaft and drive train means drivingly connecting said drive shaft to said first bar, said drive train means including a coupling member and a swivel arm, one end of said coupling member being connected to a crank member rotatable with said drive shaft and the other end of said coupling member being pivotally connected with one end of said swivel arm, wherein the other end of said swivel arm is non-pivotally connected with said first bar for movement with said first bar.

2. Apparatus according to claim 1, wherein a portion of said other end of said swivel arm constitutes said first bar.

3. Apparatus according to claim 2, wherein said guide means includes a guide member and first and second guide arms, said guide member being pivotally connected to one of said cutting bars at a position intermediate the ends of said guide member, said first guide arm having one end thereof pivotally connected to the other of said cutting bars and the other end thereof pivotally connected to an end of said guide member, said second guide arm having one end thereof pivotally connected to the other of said cutting bars and the other end thereof pivotally connected to the end of said guide member which is opposite the end of said guide member connected to said first guide arm.

4. Apparatus according to claim 2, wherein the guide means and drive train means are constructed such that the motion component of the pivot connection of the swivel arm with the coupling member and parallel to the direction of motion of the second cutting bar is slightly delayed, from the beginning of the cutting operation, with respect to the synchronism with the motion of the second cutting bar.

5. Apparatus according to claim 4, wherein said guide means includes a guide member and first and second guide arms, said guide member being pivotally connected to one of said cutting bars at a position intermediate the ends of said guide member, said first guide arm having one end thereof pivotally connected to the other of said cutting bars and the other end thereof pivotally connected to an end of said guide member, said second guide arm having one end thereof pivotally connected to the other of said cutting bars and the other end thereof pivotally connected to the end of said guide member which is opposite the end of said guide member connected to said first guide arm.

6. Apparatus according to claim 3, further comprising cutting stroke control means for varying the distance the first bar moves in the cutting direction towards said second bar independently of the rotational speed of the drive shaft, said cutting stroke control means including means engaged with a member of said drive train means.

7. Apparatus according to claim 6, wherein said cutting stroke control means includes a press rod having one end thereof connected to a pivot axle intermediate the ends of said coupling member and means for changing the position of said press rod and pivot axle.

* * * * *